Aug. 12, 1969  A. PECCHIOLI  3,460,433
PANTOGRAPH COPY MILLING MACHINE HAS A STRUCTURE
COUNTERBALANCED FOR VERTICAL MOVEMENT
Filed Jan. 31, 1967  2 Sheets-Sheet 1

United States Patent Office 3,460,433
Patented Aug. 12, 1969

3,460,433
PANTOGRAPH COPY MILLING MACHINE HAS A STRUCTURE COUNTERBALANCED FOR VERTICAL MOVEMENT
Arrigo Pecchioli, Via di Scandicci 223, Florence, Italy
Filed Jan. 31, 1967, Ser. No. 612,978
Claims priority, application Italy, Feb. 4, 1966, 2,493/66
Int. Cl. B23c 1/16, 1/18; B23b 47/26
U.S. Cl. 90—13.1         12 Claims

ABSTRACT OF THE DISCLOSURE

A pantograph copy milling machine has a structure counterbalanced for vertical movement with respect to a column mounted on the machine base. The structure in turn has a pantograph assembly counterbalanced for vertical movement with respect to said structure wherein the means for counter balancing the pantograph assembly includes a spring.

---

This invention relates to copy milling machines.

The copy milling machine to be described is of the type that has a base on which a milling table and a template-holder plate are located, and has three dimensional movement on an elevation column which column is supported by and secured by screws to, the base, and supports the entire pantograph reproduction arrangement.

According to the present invention, there is provided a pantograph milling apparatus for the reproduction or duplication of a geometrical shape by means of a material removing tool, including a base member on which is mountable a member having said geometrical shape and a workpiece to be machined, a column member rigid with said base member, a structure slidably mounted on said column member, a pantograph assembly slidably supported on said structure, said structure being counterbalanced for vertical sliding with respect to said column member, guide means on said structure to enable vertical sliding of said pantograph assembly, and counter-balancing means, including a spring inside said structure, for counter-balancing said pantograph assembly with respect to said structure.

According to the present invention there is further provided a copy milling apparatus including a base for carrying a geometrical shape to be copied and a workpiece to be machined, an upright member rigid with said base, a structure, counter-balanced and movable along a fixed path with respect to said upright member, a pantograph assembly movable along said fixed path with respect to said structure, and counter-balance means including a resilient member for counter-balancing said assembly.

The pantograph arrangement, of the embodiment to be described, instead of sliding vertically, directly on the aforesaid column, slides on an intermediate structure, which in its turn is vertically movable. As the pantograph arrangement is required to be balanced in any vertical position with respect to the structure, the counterbalancing arrangement required is housed in the structure housing. Thus the column provides vertical guides for the structure, and the structure is provided with vertical guides for the pantograph arrangement. The pantograph system consists of a vertical slide member on which two rods of a linked parallelogram are pivoted. The two rods carry an additional structure on which is slidably mounted a member, on which the tool-holder and the feeler are located.

The pantograph assembly carries a rod projecting into a vertical slot of the structure housing and to which rod there is secured a flexible member, in the form of a strip, which passes over a drum pulley to an angularly movable cam, rigid with which there is secured a second flexible member connected to a helical balancing spring. The latter is advantageously horizontal.

An embodiment of a pantograph milling apparatus in accordance with the invention, will now be described by way of example, with reference to the accompanying diagrammatic drawings, in which.

Figure 1:
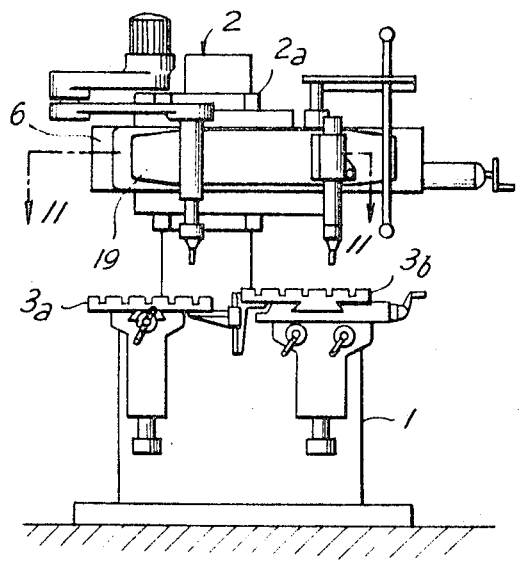
FIGURE 1 is a general elevation view of a pantograph copy milling machine.
Figure 2:
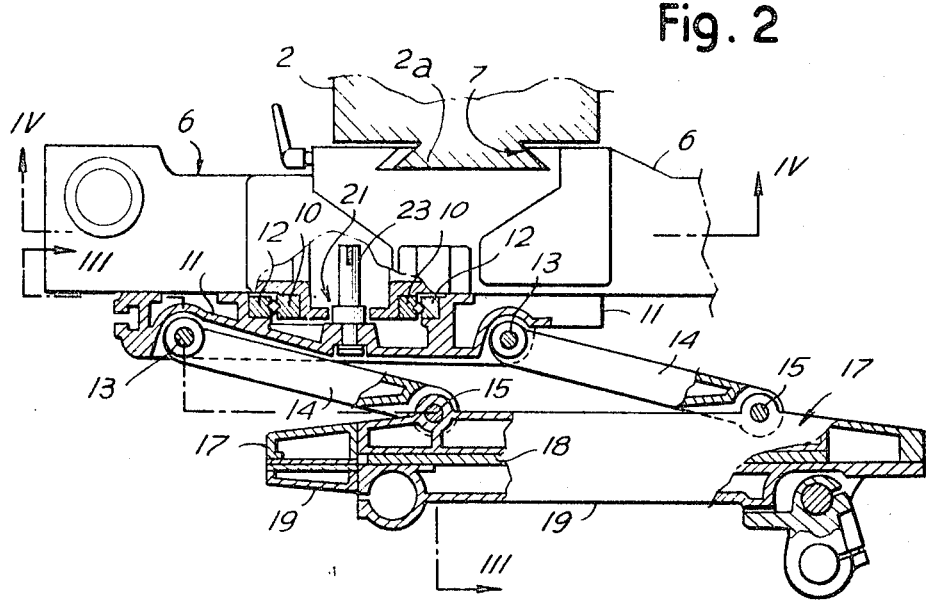
FIGURE 2 is a fragmentary, partially-sectioned plan view taken along the line II—II of FIGURE 1.
Figure 3:
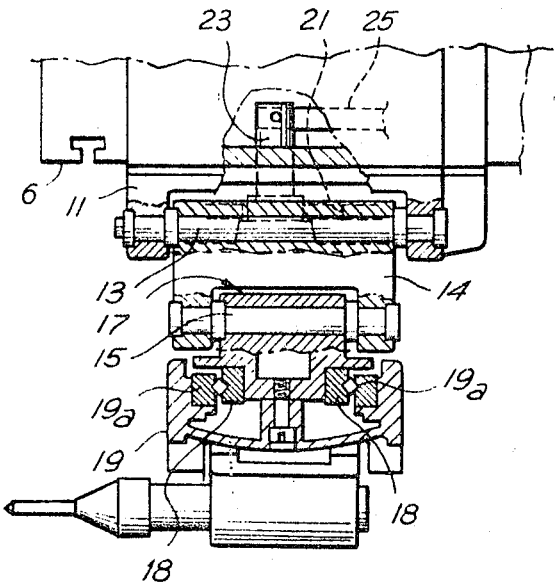
FIGURE 3 is a cross-section taken along the line III—III of FIGURE 2, which line passes through the axes of two pivots of pantograph arms.
Figure 4:
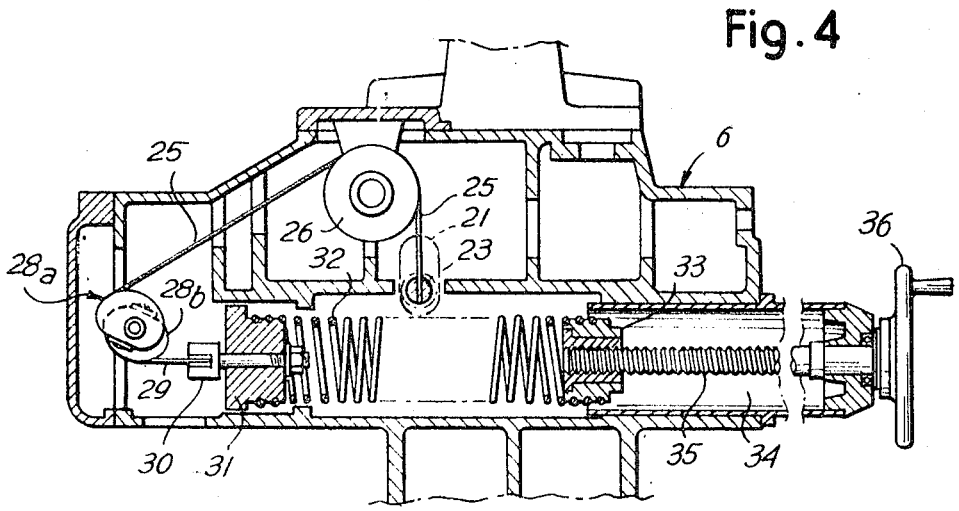
FIGURE 4 is a front view partly in section taken along the line IV—IV of FIGURE 2.

As shown in FIGURE 1, the base 1 of a pantograph copy milling machine supports a column 2 and two adjustably mounted tables 3a and 3b.

The column 2 has a vertical guide or guides 2a with which a structure 6, having a corresponding dovetail guide or guides 7, is engaged for vertical movement with respect to the column 2. The structure 6, which carries the movable members and feelers of a pantograph arrangement, is counter-balanced by a system, for example including a counterweight connected to a flexible movable transmission member on the vertical column 2.

The structure 6 is provided with rolling or sliding vertical guides 10 which are in engagement with corresponding guide members 12 which carry a slide member 11. Each of two arms 14 of a linked parallelogram system with vertical axes is pivoted at one end by pins 13 to the slide member 11, and pivotally supported at its other end by pins 15 carried by a member 17 which is movable in three directions. The member or body 17 has horizontal guides 18 which engage with a slide member 19, having corresponding guides 19a. The slide member 19 carries additional pantograph members.

To counter-balance the slide member 11 with respect to the structure 6, a spring system contained inside the structure 6 is used. The front of the structure 6 is provided, between the two guides 10, with a vertically elongated aperture or slot 21, having its vertical sides parallel to the guides 10. A horizontal rod 23 extends through the aperture 21 and is rigid with the slide member 11. A flexible strip 25, anchored at one end to the rod 23, passes over a pulley 26, inside the outer casing of the structure 6, and passes around the profile of a cam 28a. A transmission cam 28b is coupled for angular movement with the cam 28a. The flexible strip 25 is secured at its other end to a point on the cam 28a. A flexible strip 29 has one end anchored to a point on the transmission cam 28b. The strip 29 has its other end secured to a clamp 30 carried by a core 31 which core is slidably guided in the direction of the length of the structure 6, and has one end of a helical spring 32 secured thereto; the spring 32 being intended for counter-balancing. The spring 32 is secured at its other end to a core 33 which can slide without rotation in a sleeve 34, rigid with the casing of the structure 6. The core 33 has a tapped bore (axially formed therein or in a bush rigid with the core 33) in which is engaged a screw 35, coaxial with sleeve 34 and operable by rotation externally of the structure 6, by means of a hand wheel 36, positioned at one end of the sleeve 34. The tension of the spring 32 is adjusted to counter-balance the load of the slidable member 11 by rotation of the hand wheel. Thus the required movements of the slidable member 11 and all that it carries are easily achieved by an operator.

The additional movement of the entire pantograph assembly upwardly along the guides 7 increases the range of variation of the vertical measurements, of a shape or template to be machined, which may have large vertical variations. Such large variations can be followed without having to move the assembly of the template bearing planes or tables or the piece to be machined. Consequently, it is possible to reduce the length of the vertical guides for the brackets of the horizontal tables of the workpiece holder or the template-holder thereby enabling the assembly to be made more compact and stronger. It is also possible to modify the structure of the pantograph by eliminating the vertically slidable member bearing the two brackets. The vertical movement of the structure 6 of the pantograph system allows the workpieces on the tables to be positioned higher to provide a more comfortable access to the tables and consequently easier location and inspection operations. Moreover, the associated position of the template and the piece being machined is maintained unaltered with respect to the base, while the tool and the feeler provide the only vertical movement. Furthermore the variation in the weight of workpieces does not affect counter-balancing as is the case in previously proposed devices. The movable structures are more stable and more compact.

I claim:

1. In a pantograph milling apparatus for the reproduction of a geometrical shape including
a base for mounting a member having said geometrical shape, and a workpiece to be machined,
a column rigid with said base,
a structure slidably mounted on said column and,
a pantograph assembly supported by said structure,
the improvement comprising,
guide means on sair structure slidably supporting said pantograph assembly in a vertical direction, and
means for counter-balancing said pantograph assembly with respect to said structure, including a spring housed inside said structure.

2. Apparatus according to claim 1 wherein said structure includes horizontal guide means in which the ends of said spring are guided.

3. Apparatus according to claim 2 wherein said pantograph assembly includes a horizontal guide member engageable with a horizontally slidable member.

4. Apparatus according to claim 1 wherein a flexible member is secured at one end inside said structure to said pantograph assembly and is connected at its other end to an angularly rotatable cam-pulley to which there is connected a tie-rod of said spring.

5. Apparatus according to claim 4 wherein said pantograph assembly carries a rod projecting into a vertically elongated slot of said structure and to which there is connected said one end of said flexible member, an intermediate portion of said flexible member passing over a drum pulley.

6. In a copy milling apparatus including, a base for mounting means defining a geometrical shape to be copied and a workpiece to be machined, an upright member rigid with said base, a structure movable along a fixed path with respect to said upright member, the improvement comprising a pantograph assembly movable along said fixed path with respect to said structure, and counter-balancing means for counter-balancing said pantograph assembly with respect to said structure, said counter-balancing means including a resilient member.

7. Apparatus according to claim 6 wherein said structure includes horizontal guide means in which the ends of said resilient member are guided.

8. Apparatus according to claim 7 wherein said pantograph assembly includes a horizontally slidable member.

9. Apparatus according to claim 6, wherein said counter-balancing means additionally includes an elongated flexible member connected at one end to said pantograph assembly and connected at its other end through a cam pulley arrangement to one end of said resilient member.

10. Apparatus according to claim 9 wherein said pantograph assembly includes a rod rigid therewith and extending into said structure through an aperture in said structure to which said one end of said elongated flexible member is secured.

11. Apparatus according to claim 10 wherein the position of the other end of said resilient member is adjustable with respect to said structure.

12. Apparatus according to claim 6 wherein said resilient member is a helical spring.

References Cited

UNITED STATES PATENTS

| 2,260,157 | 10/1941 | Zwick | 77—36 |
| 2,364,318 | 12/1944 | Schauer | 77—36 |
| 3,266,375 | 8/1966 | Reeber et al. | 90—13.1 |

GERALD A. DOST, Primary Examiner

U.S. Cl. X.R.
33—25; 77—36